United States Patent [19]

Hossom et al.

[11] 3,912,393

[45] Oct. 14, 1975

[54] MEASUREMENTS AND ADJUSTMENTS OF CONCENTRATED SOLUTIONS

[75] Inventors: Miles G. Hossom, Wheaton; Keith R. Johnson, Rockville, both of Md.

[73] Assignee: Miles Laboratories, Inc., Elkhart, Ind.

[22] Filed: Apr. 23, 1973

[21] Appl. No.: 353,812

[52] U.S. Cl. ............... 356/36; 23/230 A; 23/253 A; 250/265; 250/274
[51] Int. Cl.² ............................................. G01N 1/00
[58] Field of Search ............ 250/564, 565, 573–576; 23/230 A, 253 A; 356/36, 104, 201, 204, 205, 206, 212, 197

[56] References Cited
UNITED STATES PATENTS

| | | | |
|---|---|---|---|
| 2,044,164 | 6/1936 | Gulliksen | 250/564 X |
| 2,066,934 | 1/1937 | Gulliksen | 250/564 X |

*Primary Examiner*—Ronald L. Wibert
*Assistant Examiner*—F. L. Evans
*Attorney, Agent, or Firm*—Marn & Jangarathis

[57] ABSTRACT

Methods and apparatus for measuring and adjusting the concentration of a solution to a standard concentration or a multiple thereof are provided in accordance with the invention by detecting the concentration of a solution and producing an electrical signal representative of the detected concentration. The electrical signal produced is compared with a reference value and diluent is delivered to the solution at a rate governed by the magnitude of the difference between the electrical signal produced and the reference value until the concentration of the solution is adjusted to substantially the same concentration of a standard solution. A measurement of the concentration of the solution is indicated by an appropriately calibrated meter.

30 Claims, 1 Drawing Figure

U.S. Patent  Oct. 14, 1975  3,912,393
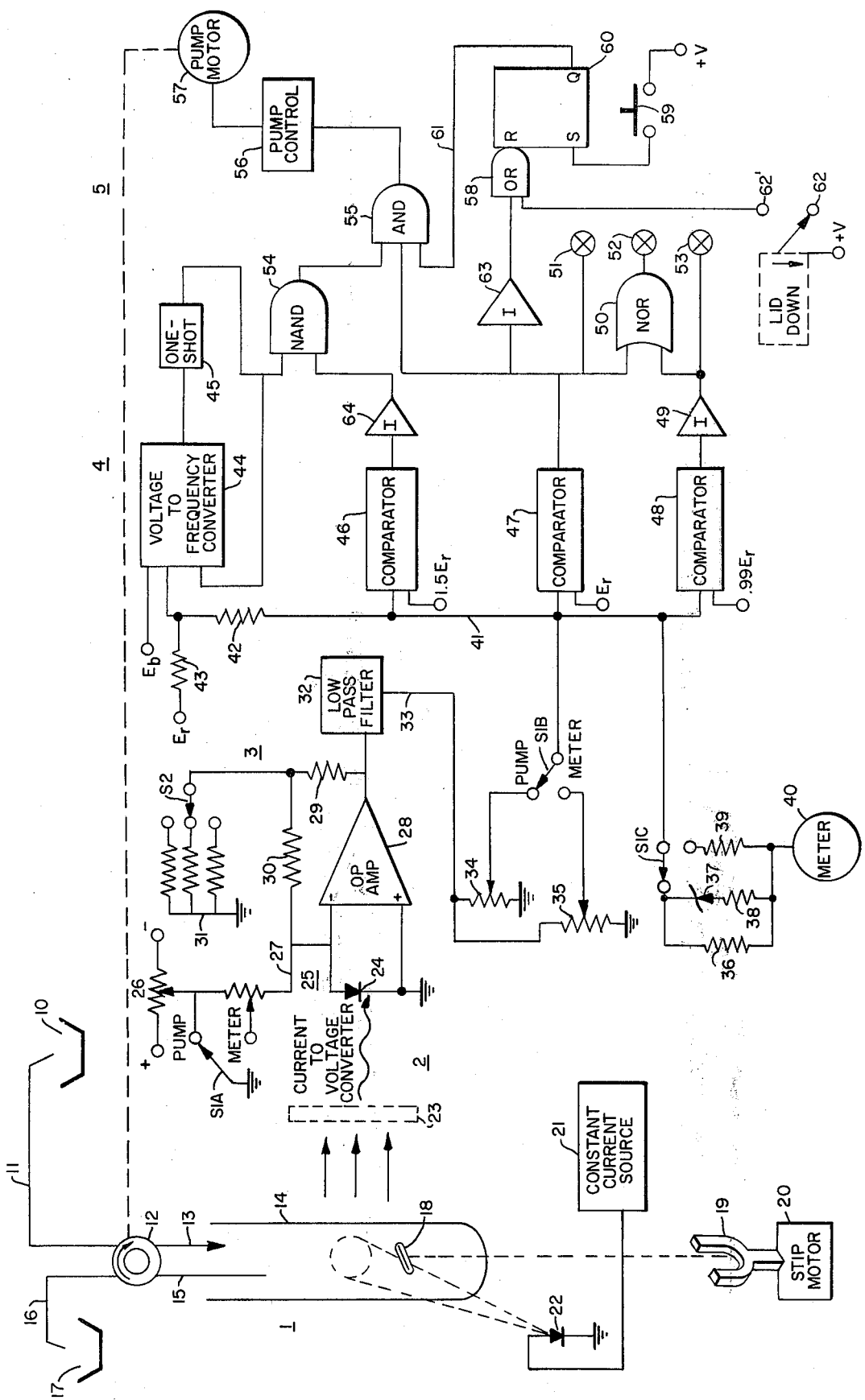

MEASUREMENTS AND ADJUSTMENTS OF CONCENTRATED SOLUTIONS

This invention relates to methods of measuring and adjusting solution concentrations and apparatus therefor, and in particular to methods and apparatus for measuring and adjusting the concentration of a solution to a desired or standard concentration.

In the course of diluting solutions, which may take the form of microbiological materials suitable for innoculation into human beings or animals, it is common practice in microbiological laboratories or clinics to dilute highly concentrated suspensions to desired, standard concentrations. However, in order to accurately prepare a suspension having a desired antibiotic susceptibility, precise measurements of the concentrations of microparticulate suspensions and, therefore, carefully controlled dilution techniques, are required. Recently, clinicians have increasingly relied on turbidimetric and nephelometric techniques in order to accurately measure concentrations of bacterial suspensions. Turbidimeters are known devices which measure the amount of light transmitted through a suspension, whereas nephelometers measure the amount of light scattered by a suspension. By measuring the amount of light transmitted or scattered, respectively, indications of suspension concentrations may be ascertained.

Although the foregoing instruments are effective to provide accurate measurement of the concentrations of microparticulate suspensions, difficulties have previously been encountered in both accurately and rapidly diluting a highly concentrated bacterial suspension to a desired, standard value. Specifically, in dilution procedures wherein, for example, a highly concentrated solution is introduced into a standard test tube, techniques for rapidly and accurately diluting the suspension to a particular standard concentration without exceeding the rate at which a diluent can be homogeneously mixed with the suspension, and additionally avoiding an overflow from the test tube caused by the rapid introduction of excess diluent, have heretofore been unavailable. Clearly, the overflow of liquid from a test tube, even if such liquid is safely collected, results in the contamination of elements for removing and introducing the liquid and, therefore, overflow of a diluted solution is to be avoided as far as possible.

Accordingly, it is an object of the present invention to provide methods and apparatus for rapidly and accurately adjusting the concentrations of liquids to a standard value.

Another object of the present invention is to provide methods and apparatus for rapidly and homogeneously diluting a concentrated liquid to a standard concentration.

It is a further object of the present invention to provide methods and apparatus for measuring concentrations of microparticulate suspensions in terms of a standard concentration.

It is yet another object of the present invention to provide methods and apparatus for continuously stirring a suspension or solution during the delivery of a diluent thereto to assure the formation of a homogeneous mixture and to enable accurate measurements of the concentration thereof to be taken.

It is still another object of the present invention to provide methods and apparatus for nephelometrically detecting the concentration of a liquid.

It is yet a further object of the present invention to provide methods and apparatus for producing an electrical error signal as a function of the concentration of the solution diluted, which electrical error signal is utilized to control the amount and rate of delivery of diluent to the solution.

It is a further object of the present invention to provide methods and apparatus for calibrating a meter in terms of a standard concentration to enable the rapid calculation of the final volume of a solution to be diluted to a predetermined concentration from a measurement of the initial concentration of the liquid.

It is yet another object of the present invention to provide methods and apparatus indicating whether the concentration of a solution is above, below, or within a specified range of a desired standard concentration.

It is still another object of the present invention to provide methods and apparatus for inhibiting the introduction of diluents to a solution to be diluted unless the initial concentration of the solution is in fact above a standard concentration and preliminary precautionary measurements are effected.

Other objects of the present invention will become apparent from the detailed description of an exemplary embodiment thereof which follows and the novel features of the present invention will be particularly pointed out in conjunction with the claims appended hereto.

In accordance with one embodiment of the present invention, an exemplary method and apparatus therefor comprises means for detecting the concentration of a solution; means for producing an electrical signal which varies as a function of the detected concentration of the solution; and means responsive to said electrical signal for controlling the rate and amount of diluent delivered to said solution such that the concentration of said solution is adjusted to a standard concentration.

The invention will be more clearly understood by reference to the following detailed description of an exemplary embodiment thereof in conjunction with the following drawing in which the sole FIGURE is a schematic illustration of apparatus for adjusting and indicating the concentration of a solution in accordance with the teachings of the present invention.

Referring now to the drawing, there is illustrated diluent supply and removal means 1, solution concentration detecting means 2, metering and control means 3, comparison and status indicating means 4, and pump control means 5. The diluent supply and removal means 1 comprises diluent and waste receptacles 10 and 17 respectively, tubes 11 and 16, a peristaltic pump 12, a solution container 14 and injecting and aspirate needles 13 and 15. A stirring bar 18, magnet means 19, and a stir motor 20 are also considered part of the diluent supply and removal means. The diluent contained in receptacle 10 may, for example, be a well known material utilized to dilute highly concentrated solutions and for purposes of convenience will be simply referred to hereafter as a diluent. A tube 11 extends between the diluent contained in receptacle 10 and the inlet of peristaltic pump 12 and, upon operation of pump 12, diluent is adapted to be supplied through an injecting needles 13 to the solution container 14. Peristaltic pumps such as pump 12 are well known to those skilled in the art as simple pumping devices for moving a fluid through a flexible conduit 11, which may take the form of a nylon tube. The solution container 14 may be any convenient vessel and, for the purpose of the present description, may take the form of a standard 22.5 ml. test tube.

An aspirate needle 15 is provided to remove excess solution from container 14 in the well known manner in order to prevent any overflow of the contents thereof. Preferably, aspirate tube 15 extends into container 14 below the emergent end of injecting needle 13 such that upon removal of excess solution, injecting needle 13 will not be contaminated. As solutions contained in container 14 are generally comprised of bacterial suspensions, it is considered particularly important to avoid the contamination of parts of the supply system, such as injecting needle 13, and thereby avoid the necessity of changing such needles upon every occurrence of an excess amount of solution being present in container 14. The peristaltic pump 12 is effective in the known manner to additionally pump excess solution through aspirate needle 15 and an exit tube 16 to a waste receptacle 17. Stir motor 20, which may take the form of a conventional a.c. motor, is coupled in the well known manner to magnet means 19 which is preferably comprised of a permanently magnetized material. Magnet means 19 may, therefore, comprise a conventional horseshoe magnet. Alternatively, the magnet means may comprise an electromagnet. Stirring bar 18, which may take the form of a teflon or other suitably coated bar of magnetizable material, is disposed in container 14 such that upon rotation of magnet means 19 by the continuous operation of stir motor 20, the magnetic torque produced by magnet means 19 is effective to rotate stirring bar 18 thereby continuously stirring and mixing the contents of container 14.

Concentration detecting means 2 is comprised of a constant current source 21, a radiation source 22, a filter means 23, and a radiation responsive means 24. The constant current source 21 may take the form of any well known electrical circuit capable of producing a substantially constant current. Radiation source 22 is adapted to emit electromagnetic radiation, preferably in the light spectrum, and may be comprised of a light emitting diode, electroluminiscent device, or other conventional light source. Preferably, radiation source 22 is adapted to produce a maximum radiation output therefrom at a particular wave length. Filter means 23 may take the form of any known filter of electromagnetic radiation such as a light filter, which is effective to pass substantially only that radiation having a wave length corresponding to the wave length of the radiation produced by radiation source 22. For example, if radiation source 22 comprises a light emitting diode which produces radiation a maximum intensity at approximately 940 nanometers, filter means 23 may, comprise an infra-red filter capable of passing substantially only infra-red radiation having a wave length of 940 nanometers. The radiation responsive means 24 may be comprised of a known silicon photovoltaic cell which operates in known manner to produce an electrical output current that varies in accordance with the intensity of radiation incident thereon. Concentration detecting means 2 is capable of operating in a known nephelometric manner wherein the amount of incident radiation transmitted by filter means 23, which is interposed between container 14 and radiation responsive means 24, is proportional to the density of the solution within container 14. In this type of operation, scattered, as opposed to transmitted, radiation is detected and the greater the density or concentration of a solution within container 14 the more radiation is scattered, and hence, detected by radiation responsive means 24. To effect satisfactory detection of scattered radiation, radiation responsive means 24 is mounted slightly above and at an angle of 90° with respect to the transmission path of radiation transmitted from source 22 to the solution within container 14. Accordingly, the electrical current produced by radiation responsive means 24 varies in accordance with the concentration or density of the solution within container 14.

Metering and control means 3 is comprised of a current to voltage converter 25, filter means 32, attenuating means 34 and 35 and meter 40. The current to voltage converter 25 comprises an operational amplifier 28, current offset control means 26, feedback resistors 29 and 30 and variable resistance means 31. Current offset control means 26 is connected to the inverting input terminal of operational amplifier 28 by conductor 27 and is adapted to be selectively shunted to a reference potential, such as ground, through switch SIA. Variable resistance means 31 preferably comprises three decade resistors that may be selectively connected into the feedback loop of operational amplifier 28 via switch means $S_2$. As the illustrated current to voltage converter 25 is well known to those skilled in the art, further description thereof will not be provided here in detail. It should be recognized that such current to voltage converter admits of variable gain and a more complete explanation thereof is provided in the publication "Handbook of Operational Amplifier Applications," Burr-Brown Research Corporation, Tucson, Arizona, 1963, and in particular at pages 43 and 56. Filter means 32, which may comprise any known low pass filter effective to pass d.c. signals or slowly varying input signals applied thereto, while blocking rapidly varying or a.c. input signals, includes an input terminal connected to the output of operational amplifier 28 and an output terminal connected in common relationship to attenuating means 34 and 35. The attenuating means may comprise conventional voltage divider networks and are here depicted as simple potentiometers. The voltages developed across each of potentiometers 34 and 35 are coupled via ganged switches SIB and SIC to the input circuit of water 40. More particularly, when switches SIB and SIC assume their respective first states, potentiometer 34 is coupled through switch SIB, conductor 41 and switch SIC to meter 40 via a non-linear network. Alternatively, when switches SIB and SIC assume their respective second states, potentiometer 35 is coupled through switch SIB, conductor 41 and switch SIC to meter 40 via resistor 39. The aforementioned non-linear network may take the form of any network of conventional elements which provides a non-linear transformation of an input signal thereto to an output terminal and is here depicted as comprising resistors 36 and 38 and zener diode 37. Meter 40 may comprise the well known ballistic galvanometer-type meter with suitably scaled indicia thereon for indicating concentrations of liquid within container 14 as a function of the magnitude of the signal applied thereto. It is preferable to show the scaled indicia of the meter to exploit full-scale reading, as will soon become apparent. Hence, the non-linear network is provided to achieve such full-scale indications by the meter 40.

The comparison and status indicating means 4 is comprised of voltage-to-frequency converter means 44, oneshot circuit means 45 comparators 46, 47 and 48, logic means 50, 54, 55, 58, 60, 63 and 64, and status indicators 51–53. Voltage-to-frequency converter means 44 may take the form of a conventionaal voltage-controlled oscillator or the combination of an integrating operational amplifier configuration and comparison means, as described in U.S. Pat. application Ser. No. 384,003, as filed in the name of Newell Claudy on Apr. 5, 1973 and assigned to Carter-Wallace, Inc., which is effective to supply output pulses of a fixed amplitude and duration at a rate which is determined by the magnitude of an input signal applied thereto. One-shot circuit means 45, which may comprise a monostable multivibrator, is adapted to operate in the well known manner to provide an output pulse of a predetermined duration which is greater than the duration of the input pulse applied thereto. Thus, one-shot circuit means 45 acts to "stretch" each input pulse to an output pulse of desired duration. Preferably, each such output pulse exhibits a negative transistion as will be described more fully hereinafter. The output of one-shot circuit means 45 is connected to a reset terminal included in voltage-to-frequency converter means 44 and is further connected to one input of an NAND gate 54, the latter circuit being a conventional logic element.

Each of comparators 46, 47 and 48 may take the form of a conventional comparison circuit having first and second input terminals and a single output terminal and adapted to provide a first or second output condition in accordance with a comparison of the magnitudes of the respective signals applied to the first and second input terminals. Logic means 50 may take the form of a conventional NOR gate having first and second input terminals coupled to comparators 47 and 48, respectively. Logic means 55 may comprise a conventional three input AND gate coupled to comparator 47, NAND gate 54 and logic means 60, respectively. Logic means 58 preferably comprises an OR gate coupled to comparator 47 and switch means 62. Logic means 60 may take the form of a conventional flip-flop device which, in a manner well known to those skilled in the art, is switched to a first binary condition upon the application of an input signal to a first or set input terminal thereof and remains in that binary condition until a second input is applied to a second or reset input terminal, at which time the output of the flip-flop 60 is switched to a second binary condition. A switch 59, which may take the form of a well known manual push-button type switch, is effective to supply an input signal to the set input terminal of flip-flop 60 and switch means 62 which may be a conventional make/break switch disposed on the closing lid of the instant apparatus, is effective to supply an input signal to the reset input terminal of flip-flop 60 via OR gate 58, for a purpose soon to be described. Status indicators 51 and 53 are coupled to comparators 47 and 48 respectively, and indicator 52 is coupled to the output of NOR gate 50. Each of status indicators 51–53 may take the form of known display elements such as incandescent lamps which are illuminated upon a predetermined input voltage applied thereto and are extinguished in the absence of such input voltage.

A further voltage comparison circuit comprised of common connected resistors 42 and 43 is provided at the input terminal of voltage to frequency converter means 44. Resistor 42 is coupled to aforedescribed conductor 41 and resistor 43 is coupled to a source of of reference voltage $E_r$. Consequently, the voltage to frequency converter means is adapted to receive a difference voltage proportional to the difference between the voltages applied to resistors 42 and 43, respectively. Preferably the voltage to frequency converter means 44 is configured so as to be disabled unless the difference voltage applied thereto exceeds a predetermined value and is confined to a predetermined range of voltages as will be described more fully hereinafter. Appropriate reference voltages are applied to the second input terminals of each of comparators 46 –48. In order to provide a full understanding of the teachings of the present invention, a particular relationship between the magnitudes of such reference signals will be described. However, it is to be understood that such particular relationship is merely exemplary of plural relationships readily apparent to those skilled in the art. In accordance therewith, the magnitude of the reference voltage supplied to the second input terminal of the comparator 46 is preferably 1.5 times as great as the magnitude of the reference voltage $E_r$, said reference voltage preferably being supplied to the second input terminal of comparator 47. Furthermore, the magnitude of the reference voltage supplied dto the second input terminal of comparator 48 is preferably 0.99 times as great as the magnitude of said reference voltage $E_r$. As will be subsequently apparent, the exemplary values suggested herein permit the disclosed apparatus to rapidly and accurately achieve a desired solution concentrate. The output terminal of comparator 46 may be a conventional inverting output terminal coupled to the second input terminal of NAND gate 54 or, alternatively, inverter means 64 may couple the output terminal of comparator 46 to NAND gate 54. Additionally, it should be noted that the output terminal of comparator 48 is, likewise, an inverting output terminal or is coupled to the illustrated circuit components by inverter means 49. Similarly, the output terminal of comparator 47 is preferably coupled to OR gate 58 by inverter means 63. Inverter means 49, 63 and 64 may each comprise conventional logic inversion circuits, well known to those familiar with the logic circuit art.

The pump control means 5 comprises a pump control circuit 56 and a pump motor 57, the latter adapted to provide a suitable mechanical drive to peristaltic pump 12. Pump control circuit 56, which may be a switching element well known to those skilled in the art, such as a triac or other suitable switchihg device, is connected to the output of AND gate 55. Pump motor 57, which may comprise a conventional electric motor, is supplied with energizing signals by pump control circuit 56 and, in response to such energizing signals, drives pumps 12 to supply diluents from source 10 to the solution within container 14. As will soon be seen AND gate 55 serves to control the energization of pump motor 57 and, therefore, the operation of pump 12.

The metering and concentration adjustment apparatus provided in accordance with the teachings of the present invention is capable of operation in either a metering or a concentration adjusting (pump) mode. Thus, the foregoing apparatus may be operated in the metering mode to provide a measurement of the concentration of an unknown solution with respect to a known or standard concentration and the operation of the present invention in such metering mode will now be described. In this mode of operation, the movable contact of each ganged switches SIA, SIB and SIC is positioned to its respective meter contact. Initially, meter 40 is accurately set to a zero value by introducing a clear or blank solution, such as water, into container 14, and adjusting current offset control means 26 to provide a compensating current to operational amplifier 28 whereby dark currents, background scattering radiation and inherent amplifier offsest currents are balanced. It is, therefore, appreciated that by so adjusting the current offset control means, the indicating arm or needle of meter 40 may be adjusted to a zero position.

Subsequent to adusting or zeroing meter 40, the meter is now in condition to be calibrated. To effect calibration, a standard solution having a standard or desired concentration is introduced into container 14. Radiation scattered by the standard solution is detected by radiation responsive means 24 which produces a current having a magnitude representative of the concentrations of the standard solution. The current is converted to a proportional voltage by current to voltage converter means 25 and then attenuated by potentiometer 35 and applied s a voltage $E_s$ to the meter. In order to calibrate meter 40, a particular meter reading must be established for the derived voltage $E_s$ which is representative of the concentration of the standard solution. This is conveniently accomplished by modifying the proportional voltage produced by current to voltage converter means 25 and by adjusting the derived voltage $E_s$ so as to be equal to a predetermined reference value such as the reference voltage $E_r$. Such modification is achieved by initially providing operational amplifier 28 with low gain and by subsequently providing a fine adjustment or attenuation to the derived voltage $E_s$ by means of potentiometer 35. The gain of operational amplifier 28 is initially set by operating switch S2 to select an appropriate one of the decade resistors 31 which, in known manner, varies the impedance of the feedback loop of amplifier 28 and consequently the gain thereof. It is recognized that the selected resistor is that which provides the lowest gain of operational amplifier 28 as it is initially assumed that the concentration of the standard solution in container 14 is the highest concentration anticipated. For such high concentration the current produced by radiation responsive means 24 is relatively high as a consequence of the high degree of scattering of incident radiation by the solution and, therefore, the least gain is required by operational amplifier 28 in order to derive the voltage $E_s$ approximately equal to the reference voltage $E_r$. Assuming that the proper resistor of decade resistor 31 has been selected such that derived voltage $E_s$ is greater than the reference voltage $E_r$, comparator 47 will provide an output signal to energize indicator 51 to indicate this relation. Voltage $E_s$ is additionally applied to comparator 48 and, as voltage $E_s$ is also greater than the reference voltage 0.99 $E_r$ supplied to comparator 48, the comparator will product an output signal which, upon inversion thereof, maintains indicator 53 extinguished. Thus, indicator 53 will not be illuminated although, as previously mentioned, indicator 51 is illuminated to indicate that the voltage $E_s$ is greater than the reference voltage $E_r$. By continuing to vary the potentiometer 35 and, if necessary by selecting different resistors of decade resistor 31, the voltage $E_s$ will eventually be attenuated to approximately $E_r$. When voltage $E_s$ admits of a magnitude within the range 0.99 $E_r$, the output of comparator 51 is now insufficient to illuminate indicator 47. Similarly, the inverted output of comparator 48 maintains indicator 53 extinguished. However, both input terminals of NOR gate 50 receive low voltages from comparators 47 and 48 to generate an energizing signal in response thereto, effective to illuminate indicator 52 which indicates that the voltage $E_s$ is within a predetermined range or within the "window" defined by the reference voltages supplied to comparators 47 and 48. Meter 40 is now properly calibrated as the reading displayed thereby is representative of the concentration of the standard solution within container 14. Upon replacing of the standard solution with an unknown solution, the relative concentration of the unknown solution with respect to the known concentration of the standard solution may be readily ascertained by merely observing the existing indication of meter 40. It may be appreciated that this feature of the present invention is readily adapted to prevent the overflow of container 14 by the unintentional addition of excess diluent. For example, if meter 40 indicates that the concentration of a standard solution provides a reading of 1.0 on a zero to 5.0 scale, and a solution of unknown concentration is placed in the container 14 and provides a reading on meter 40 of 2.0, it is then known that an equal volume of diluent must be added to reduce the concentration of the unknown solution to 1.0. Thus, by initially measuring the volume of the highly concentrated solution in container 14 and determining how much diluent is necesary to dilute that solution to a desired standard concentration, overflow of container 14 can be readily avoided.

The operation of the present invention in the concentration adjusting (pump) mode for controlling the rate and amount of diluent delivered to container 14 will now be described. The respective movable contacts of switches SIA, SIB and SIC are connected to the pump contact terminals of each switch and the voltage $E_s$ derived from irradiating the standard solution in container 14 is adjusted or "standardized" to be equal to the reference voltage $E_r$ by the appropriate selection of a resistor included in decade resistor 31 and the adjustment of potentiometer 34 in a manner analogous to that just described. It is recognized that the present state of switch SIB is effective to couple potentiometer 34 to conductor 41. Additionally, switch SIC now couples meter 40 to conductor 41 via the non-linear network. Proper "standardization" is obtained when indicator 52 is illuminated and a numerical indication of "standardization" may be provided by meter 40. The apparatus is now 37 zeroed" to the concentration of the standard solution. The standard solution may now be replaced with a highly concentrated solution which is to be diluted to the desired concentration.

To minimize erroneous operation of pump 12 when an unknown solution is placed in container 14, certain conditions must be met before diluent may be delivered to the container. The first condition requires that the closure lid of the apparatus is closed and, unless this condition is fulfilled, switch 62 remains closed to supply OR gate 58 with a source of suitable potential + V which resets flip-flop 60, thereby providing a low potential output on conductor 61 and deactivating AND gate 55. Consequently, the necessary control signal is not applied to pump control circuit 56. The second condition which must be fulfilled requires the concentration of the unknown solution to be greater than the concentration of the standard solution. Failure to satisfy this condition results in the generation of a low potential output by comparator 47 that is inverted by inverter 63 which is effective to supply a high potential signal through OR gate 58 to the rest input terminal of flip-flop 60. Assuming that the foregoing conditions have been fulfilled, the reset input terminal of flip-flop 60 is not provided with an input signal and closure of switch 59 will be effective to couple the source of potential + V to the set input terminal of the flip-flop, thereby setting said flip-flop to produce a signal over line 61 to enable AND gate 55.

In order to deliver diluent from supply 10 both rapidly and carefully to container 14, pump 12 initially operates to continuously deliver diluent until the concentration of the solution in container 14 begins to approach the concentration of the standard solution, at which point, pump 12 is operated intermittently. Thus, as long as the concentration of the solution in container 14 is more than, for example 1.5 times the standard concentration, or any other desired multiple therof, the difference voltage applied to voltage to frequency converter means lies without the aforementioned predetermined voltage range and voltage to frequency converter means 44, together with one-shot means 46, remain disabled. Consequently, a high potential constant input signal is applied to the first input terminal of NAND gate 54. As comparator 46 now detects that voltage $E_s$ applied thereto exceeds reference voltage 1.5 $E_r$, a high potential output signal is produced thereby, which signal is inverted by inverter means 64 and applied as a low potential signal to NAND gate 54. Thus as one input signal to NAND gate 54 is of low potential, a high potential output is supplied thereby to a corresponding input terminal of AND gate 55. Consequently, pump motor 57 is continuously energized by pump control circuit 56 and pump 12 continuously delivers diluent to container 14. Upon the concentration of the solution in container 14 being reduced or diluted to a concentration less than, for example, 1.5 times the concentration of the standard solution, the voltage applied to voltage to frequency converter means 44 by resistors 42 and 43 is now within the aforementioned predetermined voltage range such that the voltage to frequency converter means is enabled which, in turn, causes one-shot means 45 to produce negative transistion pulses of a predetermined duration at a rate governed by the frequency of the output pulses supplied thereto by the voltage to frequency converter means. In addition, comparator 46 produces a low potential output as input $E_s$ fails to exceed 1.5 times the reference voltage $E_r$. Accordingly, for the duration of each negative transition pulse produced by one-shot means 45, NAND gate 54 is enabled and supplies a high potential input signal to AND gate 55. Pump motor 57 and pump 12 are thus intermittently energized for intervals of time correspondidng to the duration of each pulse produced by one-shot means 45. Intermediate each of such energizing pulses, a high potential input is supplied to each input terminal of NAND gate 54 by one-shot means 45 and the inverted output of comparator 46, respectively. Hence, a low potential input signal is applied to the first input of AND gate 55 to disable the AND gate and provide a low potential output signal to pump control circuit 56. The energization of pump motor 57 and pump 12 is thus inhibited. As the concentration of the solution in container 14 further approaches the concentrataion of the standard solution, the frequency of the pulses produced by voltage to frequency converter means 44 is decreased and the internal of time between pulses produced by one-shot means 45 is increased. Accordingly, pump motor 57 and pump 12 are de-energized or maintained in an "off" condition for greater intervals of time. This operation has the additional advantage that as the "off" time is increased, greater time is available to enable a complete mix of diluent and solution in container 14 by the rotation of bar 18 which, in turn, enables the production of voltage $E_s$ which more accurately represents the concentration of the solution. The voltage to frequency converter means 44 may also be controlled in a known manner such that unless an output pulse is produced within a predetermined period of time, for example on the order of several seconds, the input voltage $E_s$ is considered to be sufficiently close to the reference voltage $E_r$ to permit an operator to conclude that the concentration of the solution in container 14 has reached a standard concentration. Accordingly, a bias voltage, $E_b$, may be supplied to voltage to frequency converter means 44 to effect the foregoing disabling thereof.

As is now readily appreciated, the concentration of a solution in container 14 may be adjusted to be substantially equal to the concentration of a standard solution. Additionally, solution concentration may be adjusted to be substantially equal to a multiple of the standard concentration. The latter adjustment may be accomplished merely by selectively connecting a voltage attenuating device, such as a potentiometer, between switch S1B and conductor 41 and by connecting the common terminal of switch S1C to the common of switch S1B. In this configuration, the voltage $E_s$ supplied to meter 40 is likewise supplied to the added potentiometer. The added potentiometer may now be adjusted to attenuate voltage $E_s$ to a predetermined extent to supply a predetermined portion of voltage $E_s$ to resistor 42 and to comparators 46 – 48. Thus assuming, for example, that it is desired to adjust the concentration of a solution to twice the concentration of a standard solution, the aforementioned potentiometer is adjusted to attenuate voltage $E_s$ by a factor of 2. In operation of the apparatus in a concentration adjusting mode, diluent is delivered to container 14 until the concentration of the solution substantially equals twice the standard concentration, at which point the magnitude of voltage $E_s$ before attenuation by the added potentiometer will be twice the reference voltage $E_r$ and meter 40 will indicate the value of the concentration of the solution in container 14 as twice that of the standard solution. However, the voltage applied to comparators 46 –48 and to resistor 43 is, nevertheless, one-half of $E_s$ equal to $E_r$.

It will be understood that although specific logic means such as gates 54, 55, 58, flip-flop 60 and inverters 63 and 64 are utilized to control the operation of pump motor 57 and pump 12, alternate logic components may be utilized in accordance with the teachings of the present invention.

The foregoing and other various changes in form and details may be made without departing from the spirit and scope of the invention. Consequently, it is intended

What is claimed is:

1. Apparatus for adjusting the concentration of a solution comprising:
   means for detecting the concentration of a solution;
   means for producing an electrical signal representative of the detected concentration of said solution;
   means for comparing said produced electrical signal with a reference value representative of the concentration of a standard solution; and
   means for delivering a diluent to said solution at a rate which varies in accordance with the magnitude of the difference between said produced electrical signal and said reference value until the concentration of solution is adjusted to substantially equal the concentration of said standard solution, said last-named means acting to deliver diluent to said solution at a first continuous rate whenever said magnitude of the difference between said produced electrical signal and said reference value exceeds a selected value until said difference in magnitude reaches said selected value and to deliver diluent to said solution at a second, periodic rate whenever said difference in magnitude is less than said selected value until the concentration of solution is adjusted to substantially equal the concentration of said standard solution.

2. Apparatus as defined in claim 1 further comprising means for continuously stirring said solution.

3. Apparatus as defined in claim 1 further comprising means coupled to said means for comparing for indicating the concentration of said solution relative to the concentration of said standard solution.

4. Apparatus as defined in claim 1 further comprising means coupled to said electrical signal producing means for providing a measurement of the concentration of said solution and calibrating means coupled to said concentration measuring means for calibrating said concentration measuring means in terms of the concentration of said standard solution.

5. Apparatus as defined in claim 1 wherein said means for detecting comprises means for producing radiation incident upon said solution and radiation responsive means, disposed so as to receive radiation scattered by said solution, for producing an electrical current having a magnitude which varies in accordance with the amount of radiation scattered by said solution.

6. Appartus as defined in claim 5 further comprising filter means interposed between said solution and said radiation responsive means, said filter means exhibiting a peak response to radiation of a predetermined wavelength, and wherein said means for producing radiation comprises radiation source means for producing radiation having a maximum intensity at said predetermined wavelength.

7. Apparatus as defined in claim 5 wherein said means for producing said electrical signals comprises current to voltage converter means coupled to said radiation responsive means for producing a voltage which varies in accordance with the current supplied thereto by said radiation responsive means.

8. Apparatus as defined in claim 7 wherein said current to voltage means comprises operational amplifier means, and said means for producing said electrical signals further comprises means coupled to said operational amplifier means for providing a coarse adjustment to the magnitude of the output voltage thereof; means for providing fine adjustments to the magnitude of the voltage supplied thereto and means for supplying said output voltage to said fine adjustment means.

9. Apparatus as defined in claim 1 wherein said means for comparing comprises first comparator means coupled to said electrical signal producing means and to said reference value for producing a first output signal when said electrical signal exceeds said reference value; and second comparator means coupled to said electrical signal producing means for producing a second output signl when said electrical signal is less than a predetermined portion of said reference value.

10. Apparatus as defined in claim 9 further comprising first indicator means coupled to said first comparator means and responsive to said first output signal produced by said first comparator means to provide an indication that the concentration of said solution is greater than the concentration of said standard solution.

11. Apparatus as defined in claim 10 further comprising second indicator means coupled to said second comparator means and responsive to said second output signal produced by said second comparator means to provide an indication that the concentration of said solution is less than the concentration of said standard solution.

12. Apparatus as defined in claim 11 further comprising logic means having first and second inputs coupled to said first and second comparator means, respectively, for producing a third output signal when said produced electrical signal is intermediate said reference value and said predetermined portion of said reference value; and third indicator coupled to said logic means and responsive to said third output signal to provide an indication that the concentration of said solution is within a predetermined range of the concentration of said standard solution.

13. Apparatus as defined in claim 1 wherein said means for comparing comprises comparison means coupled to said means for producing electrical signals, said comparison means producing a first output signal when the magnitude of said produced electrical signal exceeds said reference value by a predetermined amount and a second output signal when the magnitude of said produced electrical signal exceeds said reference value by less than said predetermined amount.

14. Apparatus as defined in claim 13 wherein said means for adding diluent to said solution comprises pump means for delivering diluent to said solution; and energizing means coupled to said comparison means for continuously energizing said pump means when said comparison means produces said first output signal and for intermittently energizing said pump means when said comparison means produces said second output signal.

15. Apparatus as defined in claim 14 wherein said energizing means comprises motor pump means and means coupled to said comparison means for intermittently energizing said pump motor means for predetermined intervals of time, which intervals occur at a rate which varies in accordance with the magnitude of said second output signal.

16. Apparatus as defined in claim 15 further comprising a closure lid and means for inhibiting the operation of said pump motor means unless said closure lid is closed and the concentration of said solution exceeds the concentration of said standard solution.

17. Apparatus as defined in claim 14 and further comprising aspirate means coupled to said pump means for removing excess amounts of said solution through said pump means.

18. A method of adjusting the concentration of a solution comprising the steps of:
   detecting the concentration of said solution;
   producing an electrical signal representative of the detected concentration of said solution;
   comparing said electrical signal with a reference value representative of the concentration of a standard solution;
   delivering a diluent to said solution at a first, continuous rate until the difference between said electrical signal and said reference value reaches a selected magnitude; and
   delivering diluent to said solution at a second, periodic rate after said selected magnitude has been reached, which second, periodic rate varies in accordance with the magnitude of the difference between said electrical signal and said reference value until the concentration of said solution is adjusted to substantially equal the concentration of said standard solution.

19. Apparatus for standardizing the concentration of a solution comprising:
   means for detecting the concentration of a standard solution;
   means coupled to said detecting means for producing an electrical signal representative of the concentration of said standard solution;
   variable impedance means coupled to said electrical signal producing means for correlating the magnitude of the produced electrical signals with respect to the magnitude of a reference value, said variable impedance means being thereby capable of calibration to produce a signal corresponding to said reference value for said electrical signal representing a concentration of said standard solution and once calibrated producing signals in response to electrical signals representative of the concentration of solutions to be diluted whose magnitude is a function of the concentration deviation of said solution to be diluted with respect to said concentration of said standard solution in terms of said reference value whereby said calibration is retained unchanged when said standard solution is replaced by a solution to be diluted to a concentration substantially equal to a preselected multiple of the concentration of said standard solution;
   means for supplying an electrical signal representative of the concentration of said solution to be diluted to said variable impedance means; and
   control means coupled to said variable impedance means for comparing said last-mentioned electrical signal with a signal representing said standard solution concentration and for regulating the rate of delivery of diluent to said solution to be diluted in accordance with said comparison.

20. Apparatus as defined in claim 19 wherein said means for producing electrial signal comprises operational amplifier means and wherein said variable impedance means comprises a variable impedance feedback network of said operational amplifier means and variable attenuator means adapted to be supplied with the output of said operational amplifier means whereby the potential developed by said attenuator means is adjusted to substantially equal said reference value by adjustment of said variable impedance feedback network and said attenuator means.

21. Apparatus as defined in claim 20 wherein the gain of said operational amplifier means is adjusted in a coarse manner by adjustment of said variable impedance feedback network.

22. Apparatus as defined in claim 20 wherein said adjustments of said variable impedance feedback network and said attenuator means are retained unchanged upon replacement of said standard solution with an unknown solution, the concentration of which is to be adjusted to substantially equal the concentration of said standard solution.

23. Apparatus as defined in claim 21 wherein said variable impedance feedback network includes a switch means and a plurality of resistors with each of said resistors being selectively coupled to said feedback network by said switch means.

24. Apparatus as defined in claim 20 wherein said attenuator means comprises a slidewire potentiometer means for providing fine adjustments to the potential supplied thereto.

25. A method of standardizing the concentration of a solution comprising the steps of:
   detecting the concentration of a standard solution;
   producing a first electrical signal representative of the concentration of said standard solution;
   establishing a correlation function by adjusting the magnitude of said first electrical signal by a determined amount to substantially correspond to a reference value;
   producing a second electrical signal representative of an unknown concentration of a solution to be standardized;
   applying said correlation function to said second electrical signal to adjust the magnitude thereof by said determined amount and obtain an adjusted electrical signal representing a concentration deviation in terms of said refernce value; and
   regulating the rate of delivery of diluent to said solution to be standardized in accordance with a comparison between said last-mentioned adjusted electrical signal and said reference value.

26. A method as defined in claim 25 wherein the step of establishing a correlation function additionally comprises the steps of adjusting the gain of an operational amplifier means to provide a coarse adjustment of said first electrical signal and varying an attenuator means to provide a fine adjustment to the output of said operational amplifier means and thereby adjust the magnitude of said first electrical signal to substantially correspond to said reference value.

27. A method of standardizing and adjusting solution concentrations comprising the steps of:
   providing a standard solution having a desired concentration;
   detecting the concentration of said standard solution;
   producing an electrical signal representative of the concentration of said standard solution;
   adjusting the magnitude of said produced electrical signal to substantially correspond to a refernce value;
   removing said standard solution;

retaining said adjustments made to said produced electrial signal;

providing an unknown solution to be diluted to a concentration substantially equal to a preselected multiple of the concentration of said standard solution;

detecting the concentration of said unknown solution;

producing an electrical signal representative of the concentration of said unknown solution;

comparing said produced electrical signal representative of the concentration of said unknown solution with said reference value; and delivering a diluent to said unknown solution at a rate which varies in accordance with the magnitude of the difference between said produced electrical signal representative of the concentration of said unknown solution and said refernce value until the concentration of said unknown solution is adjusted to substantially equal a preselected multiple of the concentration of said standard solution.

28. The method as defined in claim 27 additionally comprising the steps of:

calibrating a concentration measuring means in terms of the concentration of said standard solution; and providing a measurement of the concentration of said unknown solution relative to the concentration of said standard solution.

29. The method as defined in claim 27 additionally comprising the steps of:

providing an indication that said produced electrical signal is adjusted to substantially correspond to said reference value; and providing an indication that the concentration of said unknown solution is adjusted to substantially equal a preselected multiple of the concentration of said standard solution.

30. A method as defined in claim 27 wherein the step of delivering said diluent comprises the steps of:

continuously delivering said diluent to said unknown solution when said produced electrical signal representative of the concentration of said unknown solutionn exceeds said reference value by a predetermined amount; and intermittentily delivering said diluent to said unknown concentration when said produced electrical signal representative of the concentration of said unknown solution exceeds said reference value by less than said predetermined amount, said diluent being delivered intermittently at a rate which varies in accordance with the extent to which said signal exceeds said reference value.

\* \* \* \* \*

UNITED STATES PATENT OFFICE
CERTIFICATE OF CORRECTION

Patent No. 3,912,393           Dated  October 14, 1975

Inventor(s) MILES G. HOSSOM and KEITH R. JOHNSON

It is certified that error appears in the above-identified patent and that said Letters Patent are hereby corrected as shown below:

Column 11, line 65, after "voltage", insert -- converter --.

Column 12, line 60, "motor pump" should read as -- pump motor --.

Column 14, line 43, "refernce " should be -- reference --;

line 66, "refernce" should be -- reference --.

Column 15, line 2, "electrial" should be -- electrical --;

line 17, "refernce" should be -- reference --.

Column 16, line 17, "solutionn" should be -- solution --.

Signed and Sealed this second Day of March 1976

[SEAL]

Attest:

RUTH C. MASON  
*Attesting Officer*

C. MARSHALL DANN  
*Commissioner of Patents and Trademarks*